United States Patent [19]
Cannon

[11] 3,894,533
[45] July 15, 1975

[54] VITAL SIGN TREND INTUITIVE DISPLAY SYSTEM

[75] Inventor: Robert L. Cannon, Waltham, Mass.

[73] Assignee: American Optical Corporation, Southbridge, Mass.

[22] Filed: Nov. 2, 1973

[21] Appl. No.: 412,361

[52] U.S. Cl... 128/2.05 R; 128/2.05 Q; 346/33 ME; 346/62
[51] Int. Cl.² .......................................... A61B 5/00
[58] Field of Search .......... 128/2.05 Q, 2.05 B, 2 R, 128/2.06 R, 2.06 G, 2 G, 2 H, 2.07; 346/33 ME, 62

[56] References Cited
UNITED STATES PATENTS

| | | | |
|---|---|---|---|
| 3,181,528 | 5/1965 | Brackin | 346/33 ME |
| 3,200,404 | 8/1965 | Ott | 346/62 |
| 3,241,432 | 3/1966 | Skeggs et al. | 128/2 G |
| 3,321,767 | 5/1967 | Fulchino | 346/62 |
| 3,560,161 | 2/1971 | Webb | 128/2 R |
| 3,605,111 | 9/1971 | Schmoll | 346/62 |
| 3,648,689 | 3/1972 | Dominy | 128/2.06 R |
| 3,681,774 | 8/1972 | Harris et al. | 128/2.06 G |
| 3,707,147 | 12/1972 | Sellers | 128/2.06 G |

OTHER PUBLICATIONS

Shubin et al., "Comp. Surveillance of Seriously Ill Postren" J. Ass. Adv. of Med. Inst., Vol. 6, Jan.–Feb. 72, pp. 48–51.

Graystone, "Method of Displaying Multiplexed Sigs.", IEEE Trans. on Bio-Med. Eng'g., Oct., 1970, pp. 349–350.

Primary Examiner—Richard A. Gaudet
Assistant Examiner—Lee S. Cohen
Attorney, Agent, or Firm—Joel Wall; William C. Nealon; H. R. Berkenstock, Jr.

[57] ABSTRACT

A vital sign trend intuitive display system. A trend recorder for graphically displaying trends of vital signs of a patient is disclosed. The recorder displays these vital sign trends in a manner which is intuitively representative of the measurement process for each vital sign. Vital sign trends are recorded on cross-hatched chart paper which is advanced by the recorder in a stepped manner that is synchronized with application of recorder pens to chart paper to achieve the desired display.

19 Claims, 4 Drawing Figures

FIG. 4

VITAL SIGN TREND INTUITIVE DISPLAY SYSTEM

BACKGROUND OF THE INVENTION

1. Field of the Invention

The present invention relates in general to electro-medical monitoring and recording art. More particularly, the present invention relates to a long term vital sign trend recorder system.

2. Description of Prior Art

The electro-medical art has been growing at a rapid pace in recent years. This art relates to use of electrical and electronic embodiments which assist and/or monitor or measure certain bodily functions for diagnostic and other purposes. For example, a heart defibrillator provides therapeutic assistance to functioning of a patient's heart. An ordinary EKG monitor, on the other hand, provides monitoring or measurement information about the functioning of a patient's heart. It is with respect to the monitoring class of medical-electronic instrumentation that the present invention is related.

An ordinary EKG monitor is arranged to sense heart activity through electrodes placed upon the skin surface of a patient. Electrical signals generated by the patient are sensed by the electrodes, are amplified by an EKG amplifier, and amplified signals are fed to a galvanometer movement. The galvanometer movement controls the position or deflection of a pen which scribes on a chart paper recorder. The paper is moved at some constant velocity to provide an effective time axis in the direction opposite to paper movement. The scribing motion is orthogonal to the paper motion.

In addition to recording heart beat electrical signals, the graphical recorder has also been used to record other vital sign electrical signals. For example, respiration rate can be sensed by what is known in the art as an impedance pneumograph. The output from this device can be a signal compatible for use with a recorder such as that discussed above. Similarly, other transducers of ordinary design which are known in the art can be used to measure blood pressure, average heart rate, central venous pressure, partial pressure of oxygen, urine output, and rate of urine output. All of these vital sign measurements, in the form of electrical signals, can be made to be compatible with a recorder of the type described above and such a recorder has probably been used to record some of these kinds of signals.

However, typical practice in hospitals involves reading these vital signs on a periodic basis, perhaps every hour, and recording the data in long-hand on a hospital-prepared chart. This presents a severe problem. These charts may be approximately 18 inches square, can have vertical columns for every hour of the day and can have horizontal lines for every one of those parameters mentioned above. Nurses read parameters perhaps every hour on standard monitoring equipment and enter their figures on these charts. The charts are maintained as the nursing shifts change, and the handwriting is thus different. Some figures are entered in pencil, other are entered in ballpoint pen, and others are yet entered with felt-tip pen. At the end of the day such a chart is very messy and is completely covered with hundreds of numbers. Each patient is usually assigned such a chart, which is rapidly filled with many numbers which tend to overwhelm the observer when trying to interpret the patient's status. It is difficult if not impossible to know whether or not the patient's condition has improved from viewing this unwieldy presentation.

This type of patient monitoring problem is usually performed on patients who are recovering from a surgical operation. These patients are generally in serious or critical condition and they have to be monitored for several days. These patients are not necessarily cardiac patients. Usually many more parameters have to be monitored in general post-operative care than those monitored only in cardiac intensive care. Additionally in cardiac intensive care the physician is usually interested in quality of every heart beat and not long term trends. (If the patient has an unusual beat once a minute or even once every ten minutes this can be important.)

But, in general post-operative care, one is usually interested in long term trends and not in individual variations. Generally, systolic blood pressure, diastolic blood pressure, venous blood pressure, temperature, respiration rate, accumulative urine output, urine output rate, partial pressure of oxygen, partial pressure of carbon dioxide, and other parameters are monitored. Long term trends of these vital signs are of major interest.

The present invention solves this problem of presentation of long term vital sign data trends. The solution involves presentation of all of these parameters graphically, rather than on a hospital chart. The presentation is much clearer than the prior art presentation. It is easy to observe whether the patient's condition has improved. The present invention provides this information in a visual manner which intuitively represents usual measuring processes for that parameter.

Examples of intuitive presentations are certain familiar roadway sign posts. One may be familiar with sign posts showing a silouette of a walking human which indicates a pedestrian crossing, or which indicate "no left turn" by a left turn arrow with a negating bar across it. Other examples of intuitive representation include volume control markings on radios or other audio instruments where the control knob for loudness is partially encircled by an arcuate symbol which has a narrow width at one extreme and which gradually increases in width to a maximum width at the other extreme. Of course, this indicates that loudness is greater when the knob is positioned at the greater width, and the loudness is diminished when the knob is positioned at the smaller width.

In the present invention, the intuitive representations of a patient's vital sign measurements provide an added dimension to a physician's appreciation of the condition of the patient.

SUMMARY OF THE INVENTION

The system includes a multiplexer which receives electrical signal inputs from patient vital sign transducers which provide signals corresponding to each vital sign of interest. The multiplexer can provide at least one signal output during certain writing time intervals, and in the particular embodiment to be described in detail below, two signal outputs from the multiplexer can exist simultaneously. The multiplexer is controlled by a cycle generator (also termed sequencer) which in turn is clocked by 60 hertz, the power frequency. The cycle generator provides command signals to the multiplexer so that the vital sign signal of interest at a particular time is provided as an output from the multiplexer.

The multiplexer output is fed into a summing amplifier circuit which sums a galvanometer position feedback signal, and sometimes a variable amplitude 60 hertz signal, with the multiplexer output. This processed signal is amplified and applied to the galvanometer input to position the galvanometer pen. Pen scribings are recorded on chart paper.

Timing pulses are generated by digital circuitry within the sequencer and are 0.625 second timing pulse intervals derived from 60 hertz. The motor which drives the chart paper roll is advanced when energized for 0.625 seconds out of every 180 seconds (3 minutes). This corresponds to a 1/288 duty cycle. The signals are sampled for 4.375 seconds (seven timing pulse intervals) termed a sample interval, and the galvanometer pens write for 3.125 seconds (five timing pulse intervals) termed a writing interval. The writing interval lies symmetrically within the sample interval. There are five writing intervals per channel for each 3 minute interval. The motor and galvanometer pens are synchronized to prevent writing during motion of the chart paper.

The resultant graphical record reflects long term trends of these vital signs. Certain of the trends which have a line representation can easily be identified by different line widths resulting from different dithering amplitudes. The systolic/diastolic representation comprises two dots connected by a line. This provides an intuitive indication of blood pressure. Bar graph representations of urine accumulation and temperature are likewise easily identified. The bar graphs provide an intuitive representation of urine accumulation and temperature since they remind one of liquid being accumulated in a liquid-graduate, and mercury rising in a thermometer, respectively. Urine rate output is indicated by two dots immediately following urine accumulation. It is an advantage of the present invention to provide long term trend data of vital signs of a patient without need for long-hand-entering of data on hospital charts described earlier.

It is thus an object of the invention of the present invention to provide an improved long term trend display of vital sign data in a manner that is intuitively representative of the vital signs.

It is another object of the present invention to provide an improved patient vital sign monitoring system.

BRIEF DESCRIPTION OF THE DRAWINGS

FIG. 4 is an example of a prior art vital signal presentation.

DESCRIPTION OF THE PREFERRED EMBODIMENTS

Figure 4:
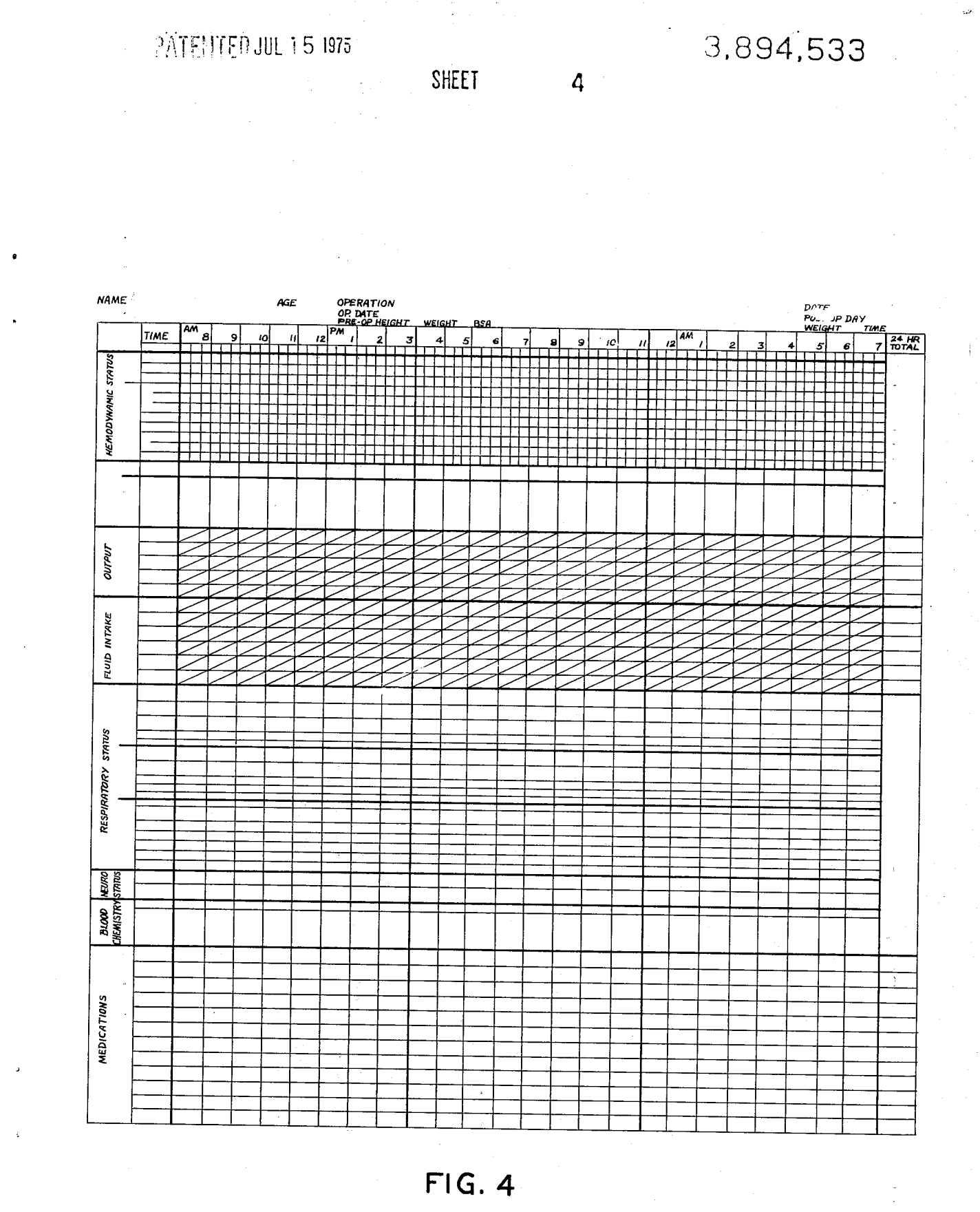

FIG. 4 depicts a hospital chart intended to be filled-in by a nurse who takes periodic measurements of a patient's vital signs. As can be seen, such a chart when completed will provide no readily ascertainable information in connection with the patient's improving or deteriorating condition. The chart simply does not lend itself to easy interpretation. There are other hospital charts of similar kind, and the one chosen for FIG. 4 appears to be typical. Other charts are even more confusing.

Figure 1:
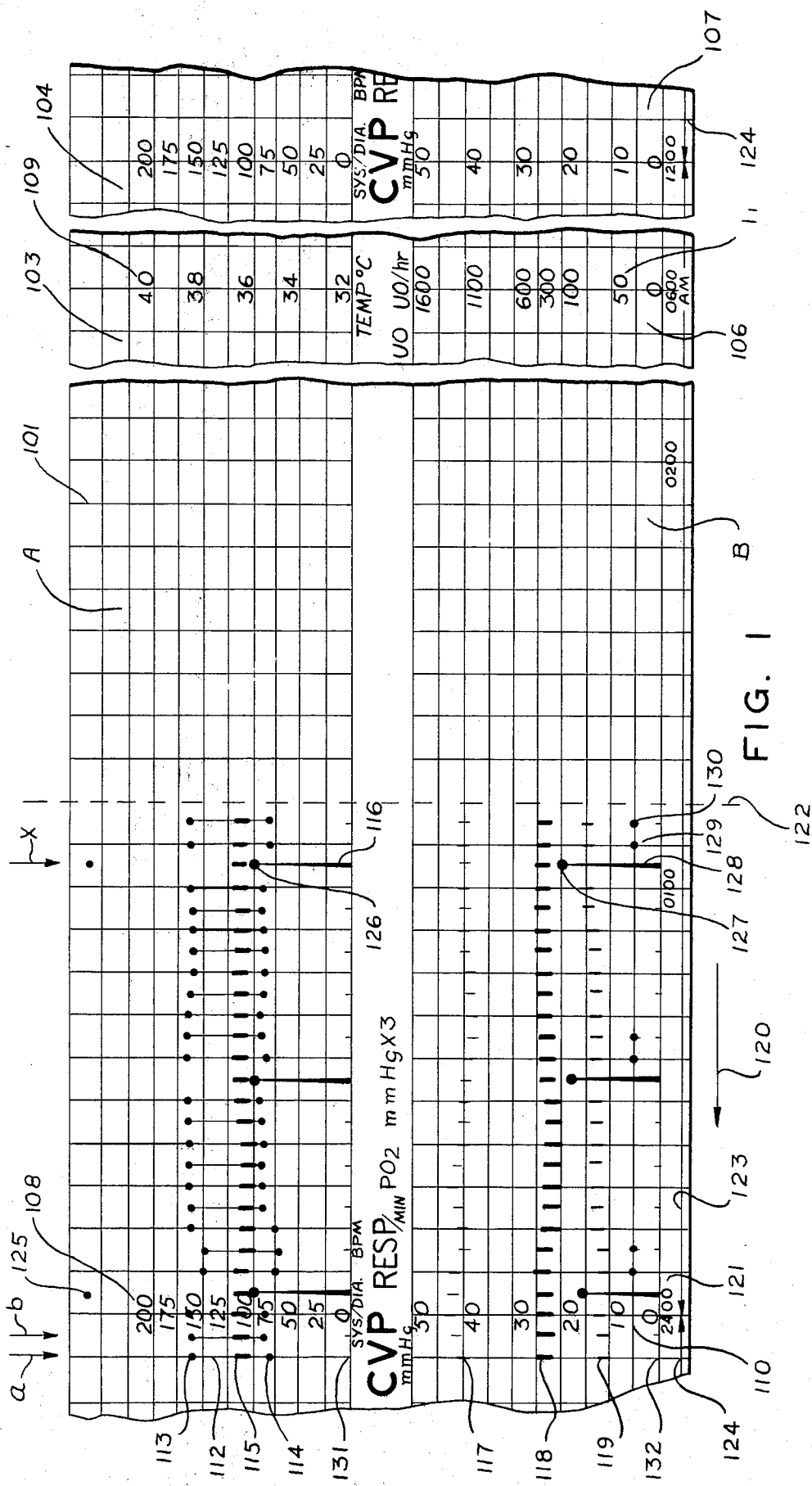
FIG. 1 is an illustrative embodiment of the graphical record of the present invention, the record being an intuitive representation of a plurality of vital sign trends of a patient.

By comparison, consider FIG. 1 which is a graphical record of the present invention. Chart paper 101 is advanced in direction 120. Galvanometer pens (not shown in FIG. 1) make contact with paper 101 at a fixed position indicated by dashed line 122. Chart paper 101 is presented as expanded in the direction of paper motion to better illustrate the markings that are made on the paper. In actual practice, the markings are compressed so that the desirable continuous-line visual effect is obtained.

Two channels are illustrated, channel A and channel B. Each of these channels is constructed from cross-hatched paper of the kind used with ink pens and may be cross-hatched paper having ten boxes per centimeter. Chart paper 103 and 104 is intended to be a continuation of chart paper associated with channel A. Similarly, chart paper 106 and 107 is intended to be a continuation of chart paper associated with channel B. Broken line representation is necessary in order to illustrate information printed on the chart paper which appears at a remote distance because of the expanded presentation and otherwise would thus not be visible.

At the bottom margin of chart paper 101 appears AM indication 123 which indicates morning readings between times of 2400 and 1200 hours. Similarly, although not completely shown, PM indicator 124 runs between hours of 1200 and 2400. Time of the day is provided at the lower margin as already mentioned; for example, time corresponding to 2400 hours is designated by reference numeral 121.

Referring to legends shown generally in the margin between channel A and channel B, CVP designates central venous pressure and is recorded in units of millimeters of mercury; RESP designates respiration and is recorded in units of breaths per minute; $PO_2$ designates partial pressure of oxygen and is recorded in units or millimeters of mercury (times 3); SYS/DIA designates systolic and diastolic blood pressure recorded in millimeters of mercury; BPM designates heart rate and is recorded in beats per minute; TEMP designates body temperature and is recorded in degrees centigrade; UO designates urine output and is recorded in milliliters; and UO/HR designates urine output rate measured in milliliters per hour. The foregoing describes general characteristics of the paper on which the data is recorded and describes meaning of legends printed thereon. The immediately following description is directed to types of information recorded.

Referring to channel A, dot 113 represents systolic blood pressure, and dot 114 represents diastolic blood pressure. These high and low pressures are connected by line 112. Mark 115 represents average heartbeat rate. These three scribings are read with respect to scale 108 which runs from zero to 200. Mark 115 is read as approximately 110 beats per minute; systolic pressure 113 is read as approximately 160 millimeters of mercury; and diastolic pressure 114 is read as approximately 75 millimeters of mercury. Dot 126 represents body temperature and is read against scale 109 as 36°C (approximately 100°F.). Shaded area 116 depicts a thermometer-like-representation of the temperature; it essentially is a bargraph representation; this provides the observer with an intuitive display of temperature.

Referring to channel B, marks 117, 118, and 119 represent respectively PO₂, CVP, and RESP. These three parameters are measured against scale 110 and are read to be approximately 120 millimeters of mercury of $PO_2$; about 23 millimeters of mercury of CVP; and about 11 breaths per minute. Dot 127 represents urine accumulation and is measured against non-linear scale 111. Dot 127 thus indicates about 100 milliliters of urine accumulated. Shaded area 128 depicts a liquid-graduate-like representation of urine accumulation defined by dot 127; it is essentially a bar graph representation; this provides an intuitive display of liquid accumulating a vessel. Mark 129 and mark 130 represent urine rate on a per hour basis and are read against scale 111 to be approximately 25 milliliters per hour. Base line dots 131 and 132 are generated as shown and provided indication of the zero reference. (Liquid graduates actually used are usually non-linear).

With respect to the foregoing, it is restated that FIG. 1 is in reality compressed in the horizontal direction to provide a near overlap of the various dots and marks presented. The resulting graphical record clearly shows the trends desired. It should be understood that although not every dot and mark depicted in FIG. 1 has been numerically designated, the numerical designations that were made are intended to represent all other dots or marks associated with the particular parameter. A dot is to be distinguished from a mark as will be later described. Thus far, a graphical record has been described; a description of FIG. 2 and FIG. 3 follows to explain how these scribings have been made.

Figure 2:
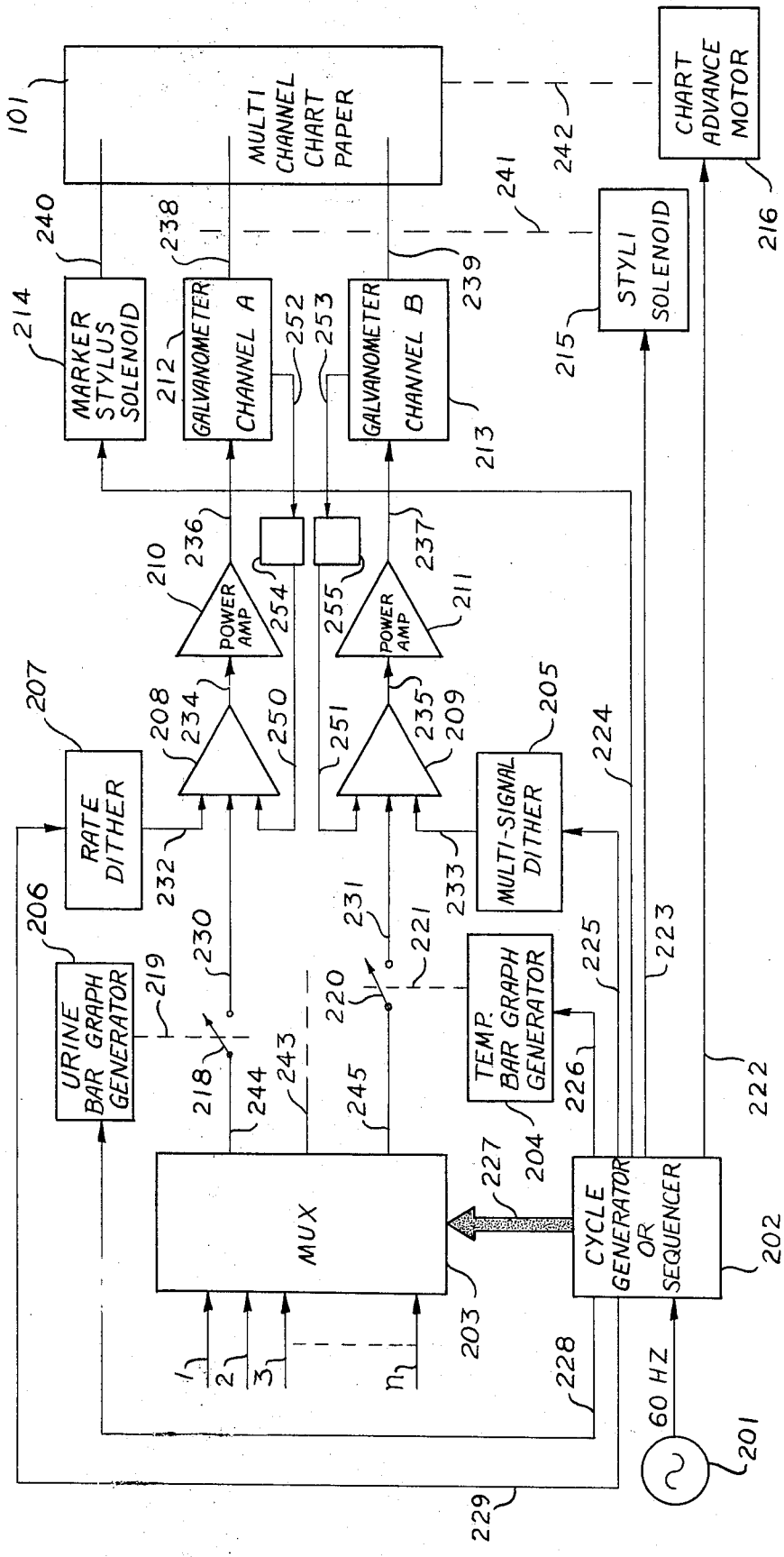
FIG. 2 is a functional block diagram of an illustrative embodiment of the present invention.

Next, consider FIG. 2, a functional block diagram of an illustrative embodiment of the present invention. 60 hertz source 201 provides a clock input to cycle generator or sequencer 202. Sequencer 202 provides command signal output on conductor 222 to chart advance motor 216. Chart advance motor 216 is mechanically linked via linkage 242 to drive multi-channel chart paper 101.

Sequencer 202 provides multi command signal inputs on multi-conductor cable 227 to multiplexer (MUX) 203. Multiplexer 203 receives vital sign signal inputs 1, 2, 3, ... n and provides vital sign signal outputs on conductors 244 and 245. Conductor 243 is intended to represent additional outputs from MUX 203 and the invention is not intended to be limited to two channel outputs.

Sequencer 202 provides 60 hertz outputs on conductors 225 and 229 to multi-signal dither 205 and rate dither 207 respectively. Outputs from these dither generators are 60 hertz signals and are conducted to summation amplifiers 209 and 208 respectively via conductors 233 and 232 respectively.

Conductors 244 and 245 are connected to conductors 230 and 231 via switches 218 and 220 respectively. (These switches are functional representations intended to illustrate the functions of urine bar graph generator 206 and temperature bar graph generator 204 respectively with more clarity than otherwise would be available if these generators were included within MUX 203. Urine bar graph generator 206 is driven by a command signal from sequencer 202 via conductor 228; conductor 226 provides a command signal from sequencer 202 to temperature bar graph generator 204. A more detailed description of this is presented below.) Conductors 230 and 231 provide signal inputs to summing amplifiers 208 and 209 respectively. The other inputs to amplifiers 208 and 209 are from feedback blocks 254 and 255 via conductors 250 and conductor 251 respectively. These blocks provide position feedback signals from galvanometers 212 and 213 respectively.

Processed vital sign signal outputs of summation amplifiers 208 and 209 are extended on conductors 234 and 235 respectively to inputs of power amplifiers 210 and 211 respectively. Outputs from these amplifiers are extended on conductors 236 and 237 respectively to galvanometer 212 and to galvanometer 213 respectively. Galvanometer outputs are visable as movements of pens 238 and 239.

Sequencer 202 provides a command signal output on conductor 233 to styli solenoid 215. Output of styli solenoid 215 is a mechanical linkage indicated by dashed line 241 which physically effects the height of galvanometer pens 238 and 239 with respect to the paper surface. Sequencer 202 likewise provides a command signal on conductor 224 to marker styli solenoid 214 which provides physical movement to marker pen 240.

Figure 3:
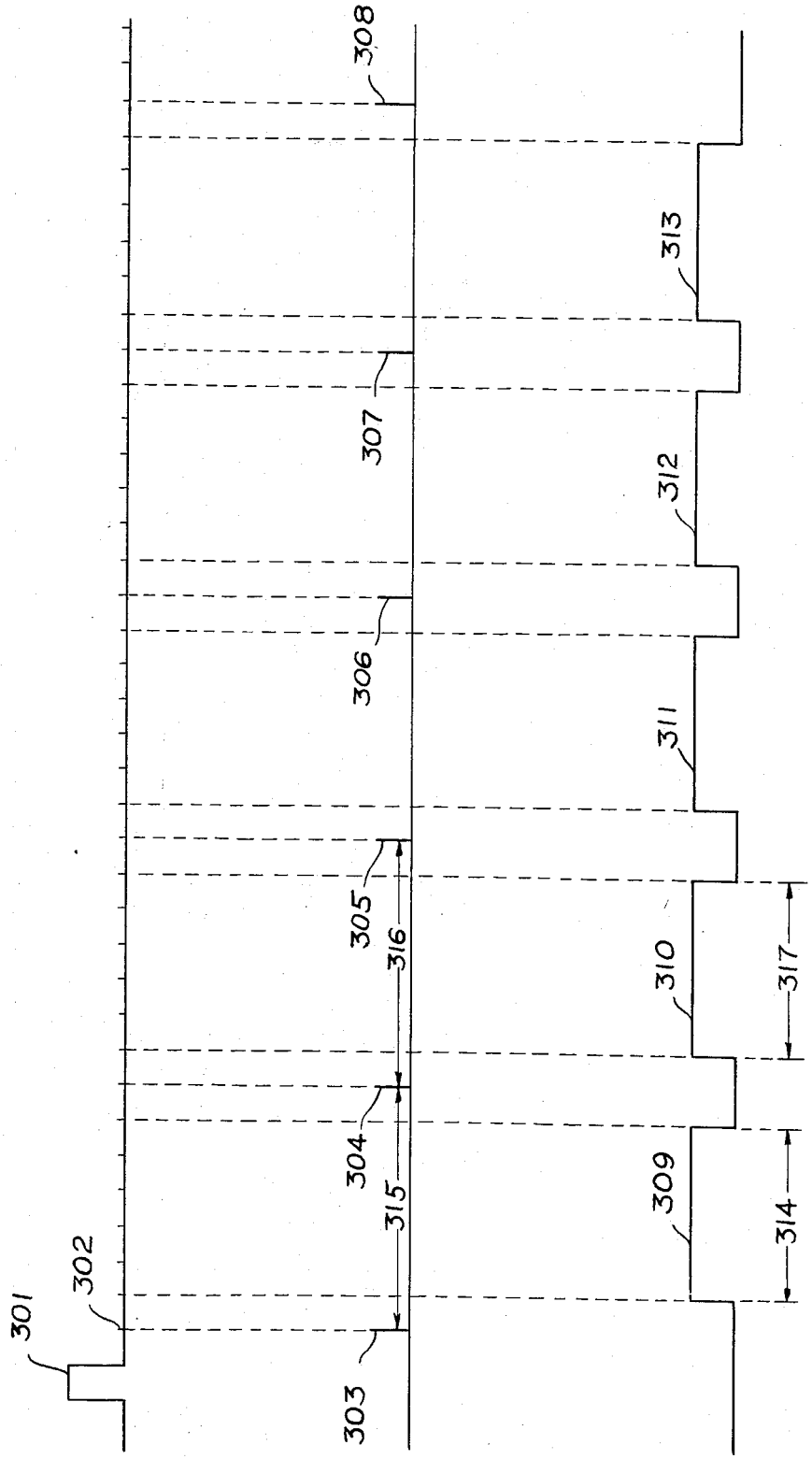
FIG. 3 is a timing diagram depicting the writing and sampling sequence of the present invention.

Before describing detailed operation of FIG. 2 it is instructive to first refer to FIG. 3, where a timing diagram is illustrated. Pulse 301 represents a 0.625 second interval pulse which is generated once in every 288 similar intervals. This is equivalent to one pulse every three minutes (288 × 0.625 seconds = 180 seconds = 3 minutes). Markings 302 are intended to represent 0.625 second intervals. Timing pulse 301 results in generation of a command signal on conductor 222 of FIG. 2 which results in energizing chart advance motor 216 which moves chart paper 101 only during time interval 301. Pulses 303, 304, 305, 306, 307, and 308 are timing spikes of narrow width compared to pulse 301, which are likewise generated in sequencer 202. It is during the intervals between these spikes that one of the vital sign signals on input conductors (1, 2, 3, ... n) is sampled for eventual display on channel A of FIG. 1, and another of the vital sign signals on these input conductors is sampled for eventual display on channel B of FIG. 1. Sampling of these two signals (where one of the signals could be equal to zero volts) continues for a duration equal to at least the duration indicated for example by interval 315 or 4.375 seconds. Interval 315 corresponds to a sampling interval. The time interval between the beginning of interval 315 and the beginning of interval 314 permits galvanometer pens 238 and 239 to be positioned above the paper at the points where they will be contacting the paper. Interval 314 is a writing interval and corresponds to 3.125 seconds. At the beginning of interval 314 styli solenoid 215 is energized and galvanometer pens 238 and 239 drop and make contact with chart paper 101. Galvanometer pens 238 and 239 remain on chart paper 101 until the end of interval 314 at which time the styli solenoid 215 is deenergized and the pens are lifted. However, the signals which were recorded during interval 314, are still sampled until the end of interval 315.

At the beginning of interval 316 two different signals, one for channel A and the other for channel B, are sampled by multiplexer 203. The respective writing time for each of these signals is interval 317. The termination of interval 317 terminates the writing and termination of interval 316 terminates sampling of these other two signals. This process repeats itself until five writing times corresponding to pulses 309, 310, 311, 312 and 313 are complete. A hiatus of approximately 156.875 seconds elapses before the next appearance of pulse 301. For each appearance of pulse 301 a new row begins to be scribed. In FIG. 1, row "a" begins to be scribed after the first generation of timing pulse 301 and row "b" begins to be scribed after the next successive generation of timing pulse 301 etc. For each cycle, the same sampling interval corresponds to the same signals; eg: interval 315 may always correspond to heart rate for channel A and to respiration rate for channel B.

Referring again to FIG. 2, in operation, vital sign signals are multiplexed in MUX 203 and vital sign signal outputs appear on conductors 244 and 245. In each case, conductors 244 and 245 provide inputs to summation amplifiers 208 and 209 (National Semiconductor Model LM 741C) which in turn provide inputs to power amplifiers 210 and 211 (National Semiconductor Model LH 0021CK) which in turn provide inputs to galvanometers 212 and 213 which in turn control galvanometer pens 238 and 239. Position feedback is achieved by generation of position feedback signals on conductors 250 and 251 to be summed at summation amplifiers 208 and 209. The position feedback signals are achieved from position feedback blocks 254 and 255 which are constructed of ordinary design.

60 hertz source 201 is the frequency with which the system is clocked. The 60 hertz source is normally guaranteed to be within a frequency accuracy of 0.1 percent which is sufficient for purposes of the system. The 60 hertz source feeds cycle generator or sequencer 202 which is constructed from the RCA CD-4000 series of COS/MOS integrated circuits. Cycle generator 202 contains a frequency doubler circuit, a divide-by-75 circuit, and a 1/288 duty cycle generator circuit, (none shown, but all being circuits of ordinary kind). Doubling a pulse train of 60 hertz provides a pulse train of 120 hertz; dividing 120 hertz by 75 provides a pulse train of 1.6 hertz; the reciprocal of which provides the period of 0.625 seconds. The 2/288 duty cycle generator is based on a counter of ordinary kind which counts pulses occurring every 0.625 seconds in a total time of 180 seconds (0.625 times 288 equals 180). The signals generated by cycle generator 202 are command signals which are distributed to various portions of the circuitry in FIG. 2 in accordance with the timing described above.

Chart advance motor 216 is mechanically linked to multi-channel chart paper 101 via linkage 242. Chart advance motor 216 receives a command signal on conductor 222 from sequencer 202 for a period of 0.625 seconds out of every 180 seconds. Thus, chart advance motor is energized only for this period of time. Multichannel chart paper 101 is thus advanced only during this 0.625 seconds and for the remaining portion of the 3 minute cycle remains stationary. Motor 216, linkage 242, styli solenoid 215, linkage 241, galvanometer 212 and 213, marker stylus solenoid 214, and pens 240, 238, and 239 are packaged as a commerically available item. This is known as the Parke Davis Transport Model 263211-796.

Multiplexer MUX 203, although not a commerically available item, is constructed again from the RCA CD-4000 series of COS/MOS integrated circuits. A multiplexer can be defined as a sequential switch. This multiplexer is a sequential switch of ordinary design, and is thus not described in further detail.

As noted earlier, five samplings are performed for each channel in order to obtain the scribing shown in row a of FIG. 1. First consider channel A and dots 113 and 114. These represent systolic and diastolic pressure measurements which could for example appear on signal inputs 1 and 2 of MUX 203. The voltage corresponding to systolic pressure is thus applied to multiplexer 203 at signal input 1. MUX 203 is commanded by sequencer 202 to begin to sample this voltage during a 4.375 second interval. The sequencer also commands MUX 203 to provide an output during an interim 3.125 second interval which causes pen 238 to scribe dot 113. But, at a predetermined time during this particular 4.375 second sampling interval, multiplexer 203 is commanded by sequencer 202 to sample signal voltage on conductor 2 and to stop sampling signal voltage on conductor 1. At this time of transfer between signal samplings line 112 is created by slowly slewing the galvanometer pen from dot 113 towards zero. The slewing is accomplished by a capacitor circuit in the sequencer which limits the speed of the pen's motion. The signal corresponding to dot 114 is sampled by MUX 203 and it prevents the slewing to reach zero. Line 112 thus terminates in dot 114. Signal input 3 of mulitplexer 203 may provide the voltage corresponding to average heart rate and may be the next signal sampled after termination of sampling of the diastolic pressure signal. The sampling of the average heart rate signal results in mark 115. Mark 115 is scribed as a result of a command signal generated by sequencer 202 on conductor 209 to rate dither 207. Rate dither 207 permits a predetermined amplitude of the 60 hertz signal to be summed with average heart rate signal in summing amplifier 208. This dithering signal, when applied to galvanometer 212 results in mark 115. However, only three signals have been sampled and there are five intervals involved. The other two sampling intervals corresponding to row a in FIG. 1 have zero input voltage and result in dot 131 at the zero line of channel A.

But, channel B is simultaneously being recorded. Multiplexer 203 is sampling other signals corresponding to those which are recorded on channel B at the same time that it is sampling signals corresponding to those that are recorded on channel A. As shown in FIG. 1, there are only three signals recorded during row a for channel B; likewise, during the last two sampling intervals MUX 203 samples signals of zero voltage and the result is dot 132 at the zero base line of channel B.

Consider the generation of marks 117, 118, and 119. These marks (and mark 115) are distinguished from the dots on chart paper 101. These marks result from dithering the galvanometer pen 239 in accordance with a 60 hertz signal for a period of between 3.125 and 4.375 seconds. This dither signal is provided by 60 hertz generator 201 and is conducted by conductor 225 to multi dither block 205. One of three specific amounts of amplitude of 60 hertz is permitted to be conducted on conductor 233 to summation amplifier 209. This is added with the signal which appears on conductor 231 to provide a dithered signal on conductor 235 to be applied to power amplifier 211. The resultant output of this signal appears on conductor 237 and is applied via galvanometer 213 to pen 239 resulting in the marks as shown. It is observed that mark 117 is the result of a minimal amount of dither; mark 119 is a result of a medium amount of dither; and mark 118 is a result of maximum amount of dither.

Consider next urine bar graph generator 206 and temperature bar graph generator 204. As earlier described, these are functional representations of digital circuitry which could likewise be depicted to exist within MUX 203. In FIG. 1, dot 126 and dot 127 correspond respectively to a measurement of body temperature and urine accumulation respectively. Note that systolic/diastolic pressure measurements are omitted when a temperature signal is being sampled for purposes of clarity of presentation. Since the temperature samplings are performed every half hour, this does not affect the trend effectiveness of the systolic/diastolic presentation. These dots are created by galvanometer pens 238 and 239 being in positions as indicated for a predetermined time within respective periods of 3.125 seconds each. The shaded portions 116 and 128 however are the result of the opening of switches 218 and 220 at the predetermined time into positions shown in FIG. 2. (At all other times these switches are closed.) This results in zero signal input to summation amplifiers 208 and 209 with the resultant slewings of galvanometer pens across paper 101 in the manner depicted to create shaded areas 116 and 128. Capacitor circuitry slows the pen movement in the slewing mode, as it did in the generation of line 112 described earlier. Finally, urine accumulation rate dots 129 and 130 are generated in the same way that the other dots are scribed.

Note that for any row, and for either channel A or B, there are never five signals scribed. Thus, the zero inputs which occur for some of the sampling intervals in each row result in zero dots 131 and 132.

Sequencer 223 provides command signals to styli solenoid 215 to caused galvanometer pens 238 and 239 to drop to the chart paper 101 as desired. These signals occur during the above-described writing intervals, the five intervals of 3.125 seconds each which follow each energization of chart advance motor 216. For all other times during the remaining portion of each 3 minutes cycle styli solenoid 215 is deenergized to maintain the galvanometer pens displaced from the paper.

Marker solenoid 214 is energized by a command signal which occurs during every other body temperature measurement. Energization of the solenoid permits marker pen 240 to drop to chart paper 101 and create dot 125 as indicated in the upper margin of chart paper 101.

The invention may be embodied in yet other specific forms without departing from the spirit or essential characteristics thereof.

For example, fifty hertz clocking can be used, with a different counter and produce either the same or different timing pulse intervals and the same or different motor duty cycle. Also, the sample and writing intervals can be changed from seven and five timing intervals, to eight and five timing intervals respectively, or to any other set of intervals compatible with the motor duty cycle that is selected. And, although the present interval between temperature and urine accumulation readings is a half hour, this could be set for other intervals as well. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for obtaining a graphical record of a plurality of electrical signals corresponding respectively to a plurality of vital signs of a patient, said record presenting said signals in graphical formats intuitively representative of typical analog measurements of said vital signs and depicting fluctuation trends of said vital signs, said method comprising the steps of:
   a. taking a measurement of each of said vital signs and in response to each said measurement providing one of said plurality of electrical signals;
   b. automatically selecting at least said one of said plurality of electrical signals during a prescribed time interval;
   c. electronically processing said at least said one of said plurality of electrical signals to obtain an equal number of respectively processed signals;
   d. operatively applying said processed signals to compatible chart paper recorder means;
   e. automatically controlling said recorder means to obtain the record of said processed signals during at least said prescribed time interval in graphical formats that are each intvitively representative of only one of said typical analog measurements of said vital signs;
   f. subjecting the remainder of said plurality of electrical signals to said selecting step, said processing step, said applying step and said controlling step seriatim and repeating said subjecting step until each of said signals is recorded; and
   g. generating said fluctuation trends by repeating said method from steps *a* through f to obtain said fluctuation trends of said patient's vital signs.

2. The method of claim 1 and wherein said selecting step comprises the further steps of:
   h. digitally generating sequential command signals having a predetermined sequence;
   i. operatively applying said plurality of electrical signals to a multiplexer;
   j. extending at least one of said command signals to said multiplexer to enable said multiplexer to provide said at least one of said plurality of electrical signals.

3. The method of claim 2 and wherein said processing step comprises the further steps of:
   k. generating a high frequency dither signal by operation of a dither generator;
   l. controlling the operation of said dither generator by at least one of said command signals;
   m. combining the output of said dither generator and said at least said one of said plurality of electrical signals to provide at least one combined signal; and
   n. amplifying said at least one combined signal in at least one amplifier.

4. The method of claim 3 and wherein said controlling step comprises the further steps of:
   o. energizing a motor for advancing said recording;
   p. energizing a solenoid for inhibiting said recording of said processed signals at least when said motor is energized; and
   q. controlling said motor and said solenoid energization by at least one of said command signals.

5. The method of claim 4 wherein said at least said one of said plurality of electrical signals corresponds to temperature of said patient and wherein said intuitively representative graphical formats resemble thermometer-like temperature displays.

6. The method of claim 4, wherein said at least one of said plurality of electrical signals corresponds to blood pressure of said patient and wherein said intuitively representative graphical formats resemble mercury-manometer-like blood pressure displays.

7. The method of claim 4, wherein said at least said one of said plurality of electrical signals corresponds to urine accumulation of said patient and wherein said intuitively representative graphical formats resemble liquid-graduate-like urine accumulation displays.

8. The method of claim 4, wherein said at least said one of said plurality of electrical signals corresponds to heart rate, central venous pressure, breath rate, and partial pressure of oxygen of said patient and wherein said intuitively representative graphical formats resemble four fluctuating lines whose amplitudes represent respective amounts of each vital sign.

9. A graphical recorder for obtaining a record of a plurality of electrical signals corresponding respectively to a plurality of vital signs of a patient, said record said signals in graphical formats intuitively representative of typical analog measurements of said vital signs and depicting fluctuation trends of said vital signs, said recorder comprising first means for taking a measurement of each of said vital signs and in response to each said measurement providing one of said plurality of electrical signals; second means for automatically selecting at least said one of said plurality of electrical signals during a prescribed time interval; third means for electronically processing said at least said one of said plurality of electrical signals to obtain an equal number of respectively processed signals; chart paper recorder means; fourth means for operatively applying said processed signals to said chart paper recorder means; fifth means for automatically controlling said recorder means to obtain the recording of said processed signals during at least said prescribed time interval in graphical formats that are each intvitively representative of only one of said typical analog measurements of said vital signs; sixth means for repetitively subjecting said plurality of electrical signals to said selecting means, said processing means, said applying means and said controlling means seriatim until each of said signals is recorded; and seventh means for generating said fluctuation trends by repetitive operation of said first means, second means, third means, fourth means, fifth means and sixth means.

10. A graphical recorder as recited in claim 9 wherein one of said vital signs is temperature of said patient and wherein said fifth means includes means for providing a thermometer-like temperature representation.

11. A graphical recorder as recited in claim 9 wherein one of said vital signs is blood pressure of said patient and wherein said fifth means includes means for providing a mercury-manometer-like blood pressure representation.

12. A graphical recorder as recited in claim 9 wherein one of said vital signs is urine accumulation of said patient and wherein said fifth means includes means for providing a liquid-graduate-like urine accumulation representation.

13. A graphical recorder as recited in claim 9 wherein a portion of said vital signs are heart rate, central venous pressure, breath rate, and partial pressure of oxygen and wherein said fifth means includes means for representing said portion of said vital signs as four independently fluctuating lines whose amplitudes represent respective amounts of each vital sign of said portion.

14. A trend recorder for displaying trends of vital signs of a patient, said recorder comprising means for obtaining electrical signals corresponding to said vital signs, circuit means operating upon said signals for providing processed signals, and graphical chart paper recorder means responsive to operation of said circuit means for recording the values of said processed signals in a predetermined graphical sequence that is intuitively representative of typical analog measurements of each of said vital signs, said sequence thereby depicting each of said trends in a manner that is intuitively representative of only one of said vital signs.

15. A trend recorder as recited in claim 10 wherein one of said vital signs is temperature of said patient and wherein said recording means includes means for providing a thermometer-like temperature representation.

16. A trend recorder as recited in claim 10 wherein one of said vital signs is blood pressure of said patient and wherein said recording means includes means for providing a mercury-manometer-like blood pressure representation.

17. A trend recorder as recited in claim 10 wherein one of said vital signs is urine accumulation of said patient and wherein said reducing means includes means for providing a liquid-graduate-like urine accumulation representation. amplitudes 18. A trend recorder as recited in claim 10 wherein a portion of said vital signs are heart rate, central venous pressure, breath rate, and partial pressure of oxygen and wherein said recording means includes means for representing said portion of said vital signs as four independently fluctuating lines whose ampliatudes represent respective amounts of each vital sign of said portion.

19. A trend recorder as recited in claim 14 wherein a first of said representing signs is temperature of said patient and said recording means includes first means for providing a thermometer-like temperature representation, a second of said vital signs is blood pressure of said patient and said recording means includes second means for providing a mercury-manometer-like blood pressure representation, a third of said vital signs is urine accumulation of said patient and said recording means includes third means for providing a liquid-graduate-like urine accumulation representation, and another portion of said vital signs are heart rate, central venous pressure, breath rate, and partial pressure of oxygen wherein said recording means includes another means for representating said portion of said vital signs as four independently fluctuating lines whose amplitudes represent respective amounts of each vital sign of said portion.

* * * * *